United States Patent Office 3,576,660
Patented Apr. 27, 1971

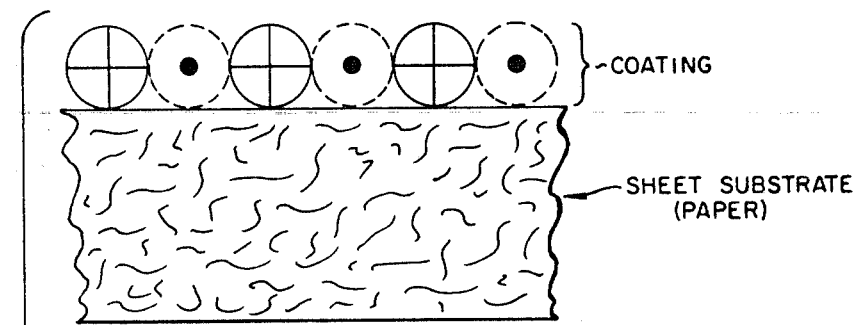

3,576,660
PRESSURE-SENSITIVE RECORD SHEET AND
COATING COMPOSITION
Robert G. Bayless, Yellow Springs, and David J. Striley,
Centerville, Ohio, assignors to The National Cash
Register Company, Dayton, Ohio
Filed July 11, 1968, Ser. No. 744,195
Int. Cl. B41m 5/16
U.S. Cl. 117—36.8                                8 Claims

ABSTRACT OF THE DISCLOSURE

A superior pressure-sensitive record sheet and an aqueous, record-sheet-coating liquid slurry composition of 10% to 30% solids, by weight, for use in its production are provided, wherein said solids of the composition comprise minute, pressure-rupturable capsules of at least two different kinds, distinguished both by their contents and by their wall materials, one kind of capsule having walls of gelatin, gelatin-gum arabic complex, or equivalent, and containing a substantially colorless, acid-activatable, chromogenic co-reactant, such as Crystal Violet Lactone, dispersed in an oil, and another kind having walls made impervious to liquid diffusion, such as those of gelatin, gelatin-gum arabic complex, or poly(vinyl alcohol), having walls that have been impregnated, in situ, with a phenolic-aldehyde resin and containing an organic, polymeric, acidic co-reactant dispersed in an oil, so that, when a continuous web or support material is thinly coated with said slurry composition and allowed to dry, a record sheet is produced having on at least one of its surfaces a thin coat of interspersed, contiguously juxtaposed, minute capsules which, when subjected to marking pressures, will rupture in areas to which the pressures are applied, to bring their liquid contents into intimate contact, this contact causing the immediate production of a distinctively colored and lasting mark on said record sheet by the acid-base, color-producing reaction of the above-described co-reactants.

There has been an existing problem in incorporating, in an aqueous medium, capsules having walls of hydrophilic, polymeric material, in that the contents of the capsules tend to escape by diffusion through the capsule walls. The use of capsules having walls made impervious by in-situ impregnation with a phenolic-aldehyde resin prevents this diffusion through the walls in aqueous media, but the formation of such in-situ-impregnated capsules is commonly and advantageously carried out in the presence of acids, so that chromogenic materials, which normally are in a colorless form and are changed to a colored form by acids, cannot be used effectively as the contents of such impregnated capsules. The use of such impregnated capsules, however, in encapsulating the acidic co-reactant which colors the chromogenic material is possible and will substantially prevent premature coloration of an aqueous slurry containing, in interspersion, the impregnated capsules with acidic contents and capsules of hydrophilic, polymeric material walls containing the chromogenic material. For the first time, an aqueous composition containing capsules which contain the two kinds of co-reactants described has been made that will not prematurely color on long standing and which can be used to produce a record sheet material stable against the effects of moderate pressure, moisture, and water vapor.

DESCRIPTION OF THE PRIOR ART

There is provided in the prior art of manufacturing pressure-sensitive record sheet materials a variety of constructions. Common to all of those that produce a colored mark by a pressure-initiated chemical reaction between two colorless co-reactants is the concept of isolating at least one of the necessary co-reactants from the other by some physical means until contact is desired and brought about by incident pressure. When, as is common, two co-reactants and a solvent are required for the color-producing reaction, the prior art teaches several possible ways of accomplishing the desired isolation of at least one of the necessary materials from the reaction site; for example:

(1) The two solid co-reactants may be coated separately on the sheet, one over the other, in close proximity to each other but mutually unreactive toward each other because of their solid state, and the necessary solvent which can bring them into intimate reactive contact is separated from them by pressure-rupturable barrier material, as is provided by minute capsules.

(2) One of the two co-reactants may be present in the coating in a solid state, and the other is dispersed in a liquid and isolated from the first co-reactant by pressure-rupturable barrier material, as is provided by minute capsules.

(3) Each of the two co-reactants may be separately dispersed in suitable solvents and separately isolated by pressure-rupturable barrier material, as is provided by minute capsules.

The second of the above methods is most common in practice; the third method is theoretically most advantageous but has not, as far as is known, been realized in commercial practice because of technical difficulties which accompany the manufacture of such a system.

The main advantage of this third method, where the necessary mark-forming components are separately isolated or encapsulated, is the enhanced stability of the resulting record sheet toward accidental color development by capsule leakage under high humidity conditions and by capsule rupture under the moderate pressures encountered in handling and storing the record sheet material. The technical difficulties encountered in the manufacture of such a record sheet material, if the capsule walls are made of hydrophilic polymeric material, is a result of the tendency of such polymeric material to absorb water, swell, and allow the capsule contents to diffuse through the walls when such capsules are suspended in an aqueous medium such as an aqueous paper-coating slurry composition. This can be overcome at some expense by making aqueous slurries of two kinds and coating the two kinds of capsules onto the paper in separate coating compositions. Even so, the paper coating is liable to some premature color development between the time of the last aqueous coating operation and the final drying of the coated sheet. Ideally, the capsule walls of the separately encapsulated co-reactants with their necessary solvents should be sufficiently stable against water-induced diffusion loss of the capsule contents to allow the different kinds of capsules to be applied as an aqueous vehicle composition in a single coating and dried to a finished product without premature color development. It is such a useful system that is disclosed and claimed in the present application.

Prior pertinent art with respect to pressure-sensitive record material is taught in U.S. Pat. No. 2,730,457, which issued Jan. 10, 1956, on the application of Barrett K. Green and Lowell Schleicher, assigned to the assignee herein; in applications for U.S. Letters Patent Ser. Nos. 612,369; 612,459; 612,497; and 612,558, filed Jan. 30, 1967, now respectively U.S. Pats. Nos. 3,491,111; 3,491,116; 3,491,117 and 3,509,174, in the name of Chao-Han Lin and assigned to the assignee herein; and in Republic of South Africa Pat. No. 63,230 (1963), which issued to John Bublitz, Jr. In the last disclosure, the mark-forming component, in one example, are an integral part of the fiber furnish for the manufacture of a paper web and are thus distributed throughout the sheet, and the mark produced by normal marking pressure is thus visible from either side of the sheet and differs from the effect obtainable by bringing together such co-reactants in a thin surface coating, as in the present invention. The Bublitz disclosure in another example teaches the avoidance of having mark-forming elements throughout the thickness of the paper by a lamination process, but such processes add to the cost of manufacture and are often unsatisfactory, and again only one co-reactant is isolated in a capsule.

Sensitized record sheet material is disclosed and claimed in application for U.S. Letters Patent Ser. No. 392,404, filed Aug. 27, 1964, by Robert E. Miller and Paul S. Phillips, Jr., and assigned to the assignee herein, now abandoned a corresponding British Pat. No. 1,053,935, having issued on Apr. 26, 1967. That case discloses a record sheet material comprising two co-reactants capable of producing a distinctively colored product when allowed to react with each other and a solvent in which both co-reactants are sufficiently soluble to allow the color-producing reaction to proceed in solution. Premature reaction is prevented by having the solvent contained in minute, pressure-rupturable capsules. One, both, or neither of the co-reactants may be separately dissolved in the solvent contained in such capsules. Release of the solvent by rupture of the capsule walls allows the co-reactants to dissolve (if not already in such solution), commingle, and react to give a colored product. It can be seen that, in cases where only one or neither of the essential mark-forming components is isolated in the liquid contents of the capsules, the rupture of a single capsule will produce a color reaction co-extensive with the liquid flow. Whereas, as in one example of the cited Miller-Phillips case and in the present invention, each of the essential mark-forming components is separately dissolved or dispersed in the liquid contents of the different kinds of capsules, the rupture of at least two capsules is necessary to produce a color, and smudging and premature coloration due to accidental or incidental capsule rupture are minimized by that fact alone. In relation to this matter, it should be noted that the manufacture of a pressure-sensitive record sheet material by the interspersion of two different kinds of capsules distinguished by their contents is not the complete object of this invention. The capsular interpersion disclosed herein is composed of at least two different kinds of capsules, distinguished by both their liquid contents and the constituents and construction of their wall material. The peculiar advantages of the system disclosed herein allow:

(1) The production and manufacturing use of an aqueous slurry of encapsulated dye precursor components without undue coloration of the slurry during its production and use; and (2) The production of a record sheet material capable of producing a distinctively colored mark when subjected to marking pressures with minimal chance of smudging and discoloration due to heat, humidity, and moderate, incidental and accidental pressures occasioned by rolling, processing, and storing of the record sheet material.

SUMMARY OF THE INVENTION

There are provided by this invention a sheet of paper or other supporting web having adhered thereto, in a layer, a closely-packed interspersion of at least two kinds of minute, liquid-containing, marking-pressure-rupturable capsules, a first kind having walls of hydrophilic, polymeric, film-forming material and containing a colorless, basic, chromogenic material, and a second kind of capsule having walls of hydrophilic, polymeric, film-forming material made strong and impermeable by the creation in its walls of a phenolic-aldehyde resin, so that the capsule contents are not leachable in aqueous media, said contents being acidic and reactive with the chromogenic contents of the first kind of capsule to produce a distinctive color; and an aqueous slurry of a mixture of such kinds of capsules which is stable on standing and is useful as a coating composition to produce the described pressure-sensitive record sheet.

DETAILED DESCRIPTION OF THE INVENTION

Therefore it is apparent that this invention pertains to an improved pressure-sensitive record sheet material which comprises a layer of a mixture of kinds of minute liquid-containing capsules, capable of being ruptured in image-representing areas, to produce a colored image, by pressure applied to the sheet with a recording instrument, and to an aqueous slurry composition of such capsules for application to a base sheet in the manufacture of such record sheet material. The mixture of capsules, interspersed in the slurry and in the layer obtained by drying a thin coating of the slurry, is, as has been said, of at least two different kinds distinguished both by their liquid contents and by their wall material.

In the preferred form of the invention, the kind of capsule in the mixture which contains the colorless chromogenic material capable of reacting with acidic material to produce a colored product is dispersed in an oil to form the capsule contents. This first kind of capsule has walls of organic, hydrophilic, film-forming, polymeric material such as gelatin or gelatin-gum arabic complex, the manufacture of which is a well-known art. For example, see U.S. Pats. Nos. 2,800,457 (issued July 23, 1957, on the application of Barrett K. Green and Lowell Schleicher), 2,800,458 (issued July 23, 1957, on the application of Barrett K. Green and reissued as Re. 24,899 on Nov. 29, 1960), and 3,041,289 (issued June 26, 1962, on the application of Bernard Katchen and Robert E. Miller), all three patents having been assigned to the assignee herein.

A second kind of capsule in the mixture contains an acidic reactant dispersed in an oil to form the capsule contents, and it has walls of organic film-forming polymeric material which are impregnated with a phenolic-aldehyde resin, formed in situ, so as to make said walls strong and impervious to liquid diffusion. One of the phenolic-aldehyde resin-precursor materials with which the walls are impregnated is itself acidic and, hence, cannot be used in making the capsules to contain the acid-sensitive chromogenic material. An attempt may be made to avoid this prohibition by conducting the in-situ resin impregnation of the capsule walls under slightly acidic to basic conditions, but this leads to dark-colored (and often fragile and porous capsules, which defeats the whole purpose of the operation. Such impregnations in which phenols and acidic media are used must, therefore, be used only in the kind of capsules that contain the acidic co-reactant which reacts to produce color in the separately encapsulated chromogenic material. It has been found that, of the several available organic polymeric film-forming materials, it is preferred to have the liquid dispersion of chromogenic material contained in capsule walls of gelatin or gelatin-gum arabic complex material, and, with such capsules, it is preferred to have the acidic co-reactant contained in walls of poly(vinyl alcohol) which is impregnated with a phenolic-aldehyde resin condensate, such as resorcinol-formaldehyde resin, which may be made by treating the poly-(vinyl alcohol)-resorcinol-complex-walled capsules, en masse, with formaldehyde. As the two kinds of capsules are made separately and later mixed in an aqueous medium to form the coating composition, the phenolic, resin-precursor material, which is acidic, does not have access to the chromogenic material. The impregnated poly(vinyl alcohol)-walled capsules may be made by the process disclosed and claimed in United States patent application Ser. No. 701,124, filed Jan. 29, 1968, in the name of Robert G. Bayless (one of the inventors herein) and Donald D. Emrick and assigned to the assignee herein. Other capsules may be present in the mixture which contain either a different chromogenic material to supplement or complement that of the first kind of capsule or a different kind of acidic reactant to develop color in the chromogenic material, as desired. More particularly, the preferred color-producing co-reactants of this invention will be disposed as follows in their respective capsules:

(1) A substantially colorless, basic, chromogenic material dispersed in an oil which forms nuclei of minute capsules having walls of gelatin or gelatin-gum arabic complex, (2) An oil-soluble, organic, polymeric, acidic material dispersed in a non-volatile or preferably a volatile oil which forms the nuclei of minute capsules having walls of gelatin, gelatin-gum arabic complex, or poly(vinyl alcohol), said walls being made impervious to liquid diffusion by reason of the phenolic-aldehyde resin created therein.

The use of a single basic, colorless, chromogenic material dispersed in the oily contents of one kind of capsule described herein is not intended to exclude the use of a mixture of such basic, colorless, chromogenic materials dispersed in the oil contents of the capsules of one kind so as to give apparently different colored marks on capsule rupture. The same is true in the case of the acid co-reactant, where it is not intended to exclude the use of a mixture of acidic co-reactants dispersed in the oily contents of the second kind of capsules. In each case, there are many such mixtures that would be obvious to and readily composed by one schooled in the art to give an operable system based on the disclosure herein.

By "dispersion," as used herein, is meant finely-divided solid or liquid matter stably suspended in a liquid, including molecular dispersions, solutions, and stable suspensions of molecular aggregates, whether such molecules and molecular aggregates be electrically charged or uncharged; that is, ionized or un-ionized.

The art of encapsulating oily liquids, such as printing inks, dyes, and colorless chromogenic materials for later development of color has been known and taught for many years. The aforementioned U.S. Pats. Nos. 2,800,457 and 2,800,458 teach methods of making, en masse, oil-containing, minute, pressure-rupturable capsules having seamless walls of organic, hydrophilic, polymeric materials including such film-formers as gelatin, casein, albumin, starch, gum arabic, alginates, Irish moss, and carboxymethylcellulose. Although the walls of such capsules are always more or less porous and permeable to gasses and small-molecule liquids in the presence of moisture, as taught in the cited patents, they are impervious enough to oils to make excellent pressure-rupturable containers. A feature of the production of the capsules is their manufacture in a sufficiently high pH vehicle to allow the encapsulation of acid-sensitive liquids or liquids containing acid-sensitive dispersions. Thus acid-activatable chromogenic materials may be retained in such capsules and be protected by the capsule walls from premature contact with acids which may come into contact with the capsules. These capsule-manufacturing processes are satisfactory where the chromogenic material and the liquid containing it are sufficiently non-mobile to be retained by the micro-porous walls of the capsule during manufacture in an aqueous vehicle or when otherwise exposed to humidity. The porosity of gelatin or gelatin-gum arabic complex walls is slight when the walls are dry and shrunken but becomes appreciable when the capsules are subjected to high humidity conditions (80% to 100% of saturation) or when the capsules are wet, as in an aqueous slurry. Many liquids of use as capsule contents, particularly liquids with some, even slight, water solubility, will diffuse through the capsule walls of such capsules under high-humidity storage conditions or during wet processing. Thus it is seen that a major limitation in the use of this kind of capsule for the purposes envisioned herein is that, when such capsules are filled with a colorless chromogenic material, even when that material is dispersed in a non-volatile oil, such as a chlorinated biphenyl, such capsules cannot be dispersed in an aqueous slurry in the presence of acidic materials, even acidic materials dispersed in non-volatile oils and contained is similar gelatin or gelatin-gum arabic complex capsules, without producing substantial color generation in the slurry at such at a rate as to make impractical the use of such mixed capsule slurries to coat paper and produce a pressure-sensitive record sheet of substantially the same color as the base paper before it was coated.

However, it is now newly found that such gelatin or gelatin-gum arabic-complex-walled capsules which contain substantially colorless chromogenic materials dispersed in an oil, such as a chlorinated biphenyl, may be dispersed in an aqueous slurry together with the acidic co-reactant without prematurely developing color during processing of the slurry when the acid co-reactant is separately contained in capsules which have been treated to make the walls impervious to liquid diffusion, such as the specified capsules with walls of gelatin, gelatin-gum arabic complex, or poly(vinyl alcohol), when such walls has been impregnated with phenolic-aldehyde resins, as taught and claimed in the before-mentioned U.S. patent application Ser. No. 701,124. In fact, this impermeability obtains even when the acidic co-reactant capsule contents are dispersed in a volatile oil, such as toluene, xylene, tetrachloroethylene, or petroleum distillate fractions of low boiling point.

Thus there is provided by this invention a particularly useful process for making a record sheet material comprising the steps of (1) suspending in water a quantity of substantially colorless, acid-activatable, chromogenic material, dispersed in an oil and contained in minute gelatin or gelatin-gum arabic complex capsules, and a quantity of organic, polymeric, acidic material, dispersed in an oil and contained in minute capsules, having walls of phenolic-aldehyde resin-ipregnated gelatin, gelatin-gum arabic, or polyvinyl alcohol), so as to make an aqueous slurry of the two kinds of capsules; (2) coating a surface of a base web or sheet, such as paper, with the aqueous slurry; and (3) drying such an aqueous coating so as to leave a dry coat of interspersed capsules in contiguous juxtaposition on at least one surface of said sheet.

Any oil-dispersible, non-volatile, acidic material could be used herein as the acidic co-reactant. Generally, and most conveniently, these materials are acidic, oil-soluble, phenolic polymers such as oil-soluble phenolic-aldehyde polymers and phenolic-acetylene polymers; oil-soluble, partially or wholly hydrolyzed poly(styrene-maleic anhydride) copolymers, and poly(methyl vinyl ether-maleic anhydride) copolymers; and carboxypolymethylene ("Carbopol 934," supplied B. F. Goodrich Chemical Company, Cleveland, Ohio, United States of America). Examples of oil-soluble, non-polymeric, acidic, organic materials suitable for use in this invention are various maleic acid-rosin resins.

The preparation of phenolic-formaldehyde polymeric materials suitable for use as the acid co-reacant in practicing this invention is described in "Industrial and Engineering Chemistry," volume 43, pages 134 to 141, January 1951, and a particular polymer thereof is described in Example 1 of U.S. Pat. No. 2,052,093, issued Aug. 25, 1936, on the application of Herbert Hönel. The preparation of suitable acid-reactant phenolic-acetylene polymers is described in "Industrial and Engineering Chemistry," volume 41, pages 73 to 77, January 1949.

The preparation of partially or wholly hydrolyzed maleic anhydride copolymers suitable for use as the acid co-reactant in the parctice of this invention is described in the literature, such as, for example, one of the maleic anhydride vinyl copolymers, as disclosed in the publication "Vinyl and Related Polymers," by Calvin E. Schildknecht, second printing, published April 1959, by John Wiley & Sons, Incorporated, New York, N.Y., United States of America; see pages 65 to 68 (styrene-maleic anhydride copolymer), 628 to 630 (poly(vinyl methyl ether-maleic anhydride) copolymer), and 530 to 531 (poly(ethylene-maleic anhydride) copolymer).

In the preferred embodiment of this invention, the acidic co-reactant is an oil-soluble, polymeric, phenolic material dispersed in a volatile oil such as toluene, xylene, or equivalent. This combination is particularly effective because it gives unusually quick and lasting color development upon contact with a base-reacting chromogenic material such as Crystal Violet Lactone. When Crystal Violet Lactone, dispersed in a chlorinated biphenyl, is expressed as a liquid from the containing capsules onto an acidic clay such as attapulgite, as in another system which is commonly in use in commercial "NCR" paper, a rapid development of color is effected. However, the color slowly fades. This situation is allowed for and corrected in commercial "NCR" paper by the addition of a second chromogenic material, benzoyl leucomethylene blue, which develops color slowly on exposure to attapulgite, light, and air, but gives a lasting color. In the preferred embodiment of the present invention utilizing a phenolic polymeric acid reactant, as described above, the addition of the second chromogenic material is unnecessary, because the color developed by liquid released on rupture of the capsules in the record sheet material described herein is both rapid in appearance, intense, and non-fading.

Other kinds of capsules, having walls sufficiently impervious as to effectively contain mobile oils, are known and are usable within the scope of this invention to contain the dispersion of the acidic co-reactant in a mobile or volatile oil. Various dual-walled capsules or "plugged" wall capsules are known which could be so used. Examples of such capsules may be found in U.S. Pat. No. 2,969,331, which issued Jan. 24, 1961, on the application of Carl Brynko and Joseph A. Scarpelli and which was assigned to the assignee herein; in U.S. Pat. No. 3,137,-631, which issued June 16, 1964, on the application of Saul Soloway; and in United States patent application Ser. No. 575,542, filed Aug. 29, 1966, in the names of David J. Striley (one of the inventors herein) and James E. Williams, which was assigned to the assignee herein and which corresponds to South African Pat. No. 4,437/67. Thus phenolic-aldehyde resin-impregnated capsular walls of gelatin, gelatin-gum arabic complex, or poly(vinyl alcohol) as the containers for the acidic co-reactant in the present invention are offered as preferred useful embodiments and are not deemed to be limiting examples. Encapsulation of the liquid dispersion of the acidic co-reactant in capsules having walls of poly(vinyl alcohol) impregnated with resorcinol-formaldehyde resin is the preferred embodiment for that element of the invention.

A choice from a variety of phenolic materials and aldehydes may be used to form the phenolic-aldehyde resins referred to herein as impregnating the capsule walls of those capsules useful for containing the acidic co-reactant dispersed in an oil. Phenolic materials which are eligible for use for such in-situ impregnation include resorcinol, hydroquinone, catechol, chloroglucinol, pyrogallol, guaiacol, bisphenol A, which is 4,4'-isopropylidenediphenol, and the like. Resorcinol is preferred because it is readily soluble in aqueous and other polar media, is readily complexed by or preferentially sorbed by many hydrophilic, polymeric, film-forming materials, and readily reacts with aldehydes to yield a resin which cures at relatively low temperatures (room temperature, 20 to 25 degrees centigrade, or somewhat lower) to produce a relatively water-insensitive product. Examples of aldehydic materials suitable for such use in making the resins include formaldehyde, glyoxal, furfural, glutaraldehyde, and the like.

The capsular wall materials for the base-reacting colorless, chromogenic material disclosed herein and referred to as being composed of gelatin or gelatin-gum arabic complex may have, as is common in the art, additional, minor, amounts of complexing and/or copolymeric material such as poly(ethylene maleic anhydride) copolymer and poly(methyl vinyl ether-maleic anhydride) copolymer, to aid in the production of and to strengthen the capsule walls, and such capsular wall material may be treated to harden it, as is commonly done, with formaldehyde, glutaraldehyde, or other aldehydes commonly used to harden gelatin, or less commonly used materials such as metallic salts typified by water-soluble salts of uranium and vanadium as taught and claimed in U.S. patent application Ser. No. 586,943, filed Oct. 17, 1966, in the name of Donald D. Emrick and assigned to the assignee herein.

There are many acid-activatable, substantially colorless, chromogenic materials suitable for the practice of this invention. Examples of suitable basic materials having chromogenic groups are bis-(p-aminoaryl)-phthalides; leucauramines; acyl auramines; $\alpha,\beta$-unsaturated aryl ketones; basic mono-azo dyes; Rhodamine B Lactams such as N-(p-nitrophenyl) Rhodamine B Lactams; amino-substituted polyaryl carbinols; and 8'-methoxybenzoindolinospiropyrans, which are named and numbered in Henry H. Baum's U.S. Pat. No. 3,293,055, issued Dec. 20, 1966. Illustrative compounds of each group are— bis-(p-aminoaryl)phthalides:
 3,3 - bis(p - dimethylaminophenyl) - 6-dimethylaminophthalide (hereinafter referred to as Crystal Violet Lactone) and 3,3 - bis - (p - dimethylaminophenyl)-phthalide (Malachite Green Lactone);

leucauramines:
 the N-halophenyl derivatives of leucauramine disclosed in U.S. Pat. No. 2,828,341, issued Mar. 25, 1958, on the application of Clyde S. Adams, Marjorie J. Cormack, and Mary Lou Frazier; and the N-alkyl-halophenyl derivatives of leucauramine disclosed in U.S. Pat. No. 2,828,342, issued Mar. 25, 1958, on the application of Clyde S. Adams and Marjorie J. Cormack, particularly N-(2,5-dichlorophenyl) leucauramine;

acyl auramines:
 N-benzoyl auramine and N-acetyl auramine;

$\alpha,\beta$-unsaturated aryl ketones:
 dianisylidene acetone; dibenzylidene actone; and anisylidine acetone;

basic mono-azo dyes:
 p-dimethylaminoazobenzene-o-carboxylic acid (Methyl Red);
 4-aminoazobenzene (Oil Yellow AAB); and 4-phenyl-azo-1-naphthylamine;

Rhodamine B Lactams:
 N-(p-nitrophenyl) Rhodamine B Lactam;

polyaryl carbinols:
 bis-(p-dimethylaminophenyl) methanol, called Michler's Hydrol; Crystal Violet Carbinol; and Malachite Green Carbinol; and 8'-methoxy benzoindolinospiropyrans:
 8'-methoxy benzoindolinospiropyran; 4,7,8'-trimethoxy-benzoindolinospiropyran; and 6'-chloro-8'-methoxy-benzoindolinospiropyrans.

In the present invention, paper is envisioned as the most useful record material base sheet or web support member for the capsular coating. However, the coating could equally well and effectively be applied to base sheets of other fibrous materials (such as cloth, wood, and leather), metal, and continuous polymeric materials films.

DISCUSSION OF THE DRAWING

The accompanying drawing is a stylized edge-view of a portion of the record sheet material disclosed and claimed herein. No attempt has been made to draw the different parts of the drawing to scale because of the variation in size of eligible capsules and the variation in thickness of the possible supporting web materials useful in practicing the invention. Generally speaking, the thickness of the supporting web material, such as paper, is many times the average cross-sectional diameter of the capsule units. The thickness of the supporting web material is of minor consequence; the average cross-sectional diameter of the capsule units should be in the range of 1 to 25 microns.

The capsules should be interspersed as shown, in contiguous juxtaposition. The alternation of kinds of capsules in the stylized drawing is not required, but is intended to show one small segment of a more or less perfect, random, interspersed distribution. A layer of capsule units, one capsule-unit-diameter in thickness, as shown, and of the indicated capsule unit size, is sufficient in amount to yield a readable mark, but a layer of greater thickness will do as well.

EXAMPLES OF COATING COMPOSITIONS AND RECORD SHEETS COATED THEREWITH

Example 1.—(Coating compositions)

Poly(vinyl alcohol)-walled capsules, impregnated with resorcinol-formaldehyde resin and containing acid-reacting, polymeric, phenolic material in oily liquid dispersion, were prepared substantially as disclosed in the previously-cited method of Bayless and Emrick, taught and claimed in U.S. application for Letters Patent Ser. No. 701,124, filed Jan. 29, 1968, except for capsule contents and wall thickness. A slight modification of that procedure for the purpose of this invention follows, as Section (a), for the sake of completeness. Section (b), following Section (a), shows the preparation of gelatin-gum arabic-walled capsules containing colorless chromogenic material. Section (c) shows the preparation of an aqueous slurry of a mixture of capsules of Sections (a) and (b), suitable for use in coating a paper to make a record sheet capable of yielding colored marks on pressure-application of an inkless printing member or stylus.

*Section (a).*—Into a Waring Blendor mixer cup having a capacity of about one liter were placed 50 milliliters of a 10%, by weight, solution of a p-phenylphenol-formaldehyde resin (such as that designated "Bakelite CKM 5254," supplied by Union Carbide Corporation, Plastics Division, New York, N.Y., United States of America) in tetrachloroethylene, and 160 milliliters of 5%, by weight, aqueous poly(vinyl alcohol) solution. The poly(vinyl alcohol) solution was prepared as follows: 1.6 grams of about 86,000-molecular-weight poly(vinyl alcohol) characterized by having a viscosity of about 28 to about 32 centipoises in a 4%, by weight, aqueous solution at 20 degrees centigrade, and by being 99% to 100% hydrolyzed (such as the material designated "Elvanol 71–30" sold by E. I. du Pont de Nemours and Company, Wilmington, Del., United States of America), and 6.4 grams of about 125,000-molecular-weight poly(vinyl alcohol) characterized by having a viscosity of about 35 to 45 centipoises in a 4%, by weight, aqueous solution at 20 degrees centigrade and by being 87% to 89% hydrolyzed (such as the material designated "Elvanol 50–42" sold by the aforementioned E. I. du Pont de Nemours and Company) were dissolved in enough water to yield a total volume of 160 milliliters of solution. The mixer was operated for about ten minutes to produce dispersed particles of tetrachloroethylene, with the p-phenylphenol-formaldehyde resin dissolved therein, having diameters of 5 to 15 microns, and the contents of the mixer cup were transferred to a vessel having a capacity of about 1,500 milliliters and equipped for agitation and heating. Agitation was initiated to maintain the dispersion. The mixer cup was rinsed with 400 milliliters of warmed (55 degrees centigrate) water, which rinse water was also added to the vessel. Two hundred milliliters of 11%, by weight, aqueous gum arabic solution and 200 milliliters of 5%, by weight, aqueous resorcinol solution were added, with cooling, to the agitated system. The continuously agitated reaction mixture was cooled to 15 degrees centigrade and allowed to react for about thirty minutes. Then, while agitation and cooling were continued, the following reagents were successively added: 100 milliliters of 3%, by weight, aqueous sodium sulfate solution (dropwise), 30 milliliters of 10%, by weight, aqueous urea solution (added to serve as an anti-agglomeration agent for the now-formed capsules), 60 milliliters of 37%, by weight, formaldehyde solution, and sufficient 10%, by weight, aqueous sulfuric acid solution to result in a pH below 2 (to bring about a condensation reaction between the resorcinol and the formaldehyde). The system was agitated overnight (fourteen to sixteen hours), during which time the temperature of the system gradually rose to room temperature (about 25 degrees centigrade). The capsules produced may be used without isolation from the aqueous medium in which they were produced, particularly if sufficient aqueous alkali such as dilute sodium hydroxide is added to adjust the pH to near neutrality (that is, to a pH value of about 6 to 8). Alternatively, the capsules may be isolated by filtration or decantation, washed as desired with additional water, and dried, if desired, by being spread on an absorbent surface at room temperature and humidity. The isolated capsules, whether dried or still damp, may be resuspended in water, five to twenty parts of water to one of capsules, by weight, being a useful slurry concentration range.

The addition of the aqueous solution of gum arabic in the above preparation may be omitted. Such an addition causes a more complete separation and deposition of the poly(vinyl alcohol)-resorcinol complex. Under these conditions, very little of the gum arabic appears to be incorporated in the capsule wall material.

The aqueous solution used above, which is 5%, by weight, in resorcinol, may also be 0.1%, by weight, in gallic acid. The addition of gallic acid is unnecessary, but it appears to give a somewhat stronger capsule wall.

*Section (b).*—For the encapsulation of the colorless, chromogenic material, 105 grams of a 1.5%, by weight, solution of Crystal Violet Lactone in a mixed solvent, consisting of 2 parts, by weight, of a chlorinated biphenyl such as "Aroclor 1242," supplied by Monsanto Chemical Company, St. Louis, Mo., United States of America, and 1 part of "Magnaflux" oil, a hydrocarbon oil with a distillation range of 370 to 500 degrees Fahrenheit, supplied by Magnaflux Corporation, Chicago, Ill., United States of America, was emulsified at 45 degrees centigrade by being stirred in a Waring Blendor for eight minutes at slow speed with 68.0 grams of an 11%, by weight, aqueous solution of pigskin gelatin, having an isoelectric point at about pH 9, and 37.3 grams of water. This resulted in an emulsion of oil droplets of 2 to 5 microns in diameter. The emulsion was then added, with continued stirring, to a warmed solution (55 degrees centigrade), consisting of 6.0 grams of a 5%, by weight, aqueous solution of poly(methyl vinyl ether-maleic anhydride) copolymer such as a "Gantrez AN" copolymer wth a specific viscosity (1 gram of copolymer in 100 milliliters of butanone and determined at 25 degrees centigrade) of 0.9 to 1.0 poise as supplied by General Aniline and Film Corporation, New York, N.Y., United States of America, 45.5 grams of an 11%, by weight, aqueous solution of gum arabic, and 325.5 grams of water. The pH of the system was adjusted to pH 9.0 with aqueous sodium hydroxide solution. With the temperature of the stirred emulsion at 55 degrees centigrade, the pH was lowered to 4.5 by the slow, dropwise addition of 6.75 milliliters of 14%, by weight, aqueous acetic acid to cause the separation of the coacervate phase of polymeric film-forming material as liquid capsule walls surrounding the emulsified droplets which constitute the internal phase. To solidify or gel the gelatin-gum arabic complex walls, the mixture was, with continued agitation, cooled in an ice bath to 10 degrees centigrade. Then, to harden the gelled capsules, 3.75 milliliters of a 25%, by weight, aqueous solution of glutaraldehyde was added, followed thirty minutes later by the addition of 7.0 milliliters of a 5%, by weight, aqueous solution of poly(methyl vinyl ether-maleic anhydride) copolymer to prevent agglomeration of the capsules, and one hour later by the addition of 2.5 milliliters of a 20%, by weight, aqueous solution of sodium carbonate and enough aqueous sodium hydroxide solution to raise the pH of the system to 10. Stirring was continued throughout the preceding operations and then was continued for the next sixteen to eighteen hours. The temperature was allowed to rise from 10 degrees centigrade to room temperature during this prolonged stirring. The resulting slurry may be used as is, or the capsules may be isolated by filtration, washed on the filter with water, and dried in the air or used as a damp solid without drying.

Section (c).—An aqueous slurry of the air-dried acidic-co-reactant-containing capsules produced in Section (a) is mixed with air-dried capsules of Section (b), containing the colorless, chromogenic material or an aqueous slurry of such capsules, so that the final concentration of mixed capsules in the slurry is 10% to 30%, by weight, or, more particularly, about 20%. Considerable variation is allowed in the ratio of one kind of capsule to the other in the slurry. A good and useful mixture contains about equal weights of the two kinds of capsules on a dry capsule weight basis.

Example 2.—(Coated record sheet)

The aqueous slurry of Example 1, Section (c), or, more simply, a combination of equal volumes of the two kinds of aqueous, capsular slurries produced by the methods of Example 1, Sections (a) and (b), without isolation of the capsules from the aqueous manufacturing vehicle, was mixed, and the pH of the resulting slurry was adjusted to about 7 by the addition of dilute sodium hydroxide. The slurry was coated on white paper with a Meyer rod to give, when dried, a white-appearing, coated paper with a final dry weight of coating of about five pounds per ream (500 sheets) of paper, the sheets having dimensions of 25 inches by 38 inches. Printing pressure on the coated face of the paper produced blue marks, corresponding to the patterns imprinted, of good definition and intensity, even if additional sheets of paper were interposed between the printing member and the coated paper. A stored sample of the aqueous slurry of mixed capsules showed no appreciable coloration after eight hours, thus giving the practitioner of the invention a commercially feasible period of time for putting the composition to use.

Example 3.—(Coating composition)

An aqueous slurry was prepared so as to contain about 20%, by weight, of capsules. The capsules used were about a 1:1 mixture, by weight, of those capsules of Example 1, Section (a), as a slurry in the aqueous preparative medium of that example, and Crystal-Violet-Lactone-containing capsules, prepared according to the following directions. These directions are a partial rendering of Example I of Bruce W. Brockett's U.S. Pat. No. 3,179,600, issued Apr. 20, 1965; the final coating of the capsular wall with colloidal silica was omitted. The resultant capsules had walls of gelatin-gum arabic complex with poly(methyl vinyl ether-maleic anhydride) copolymer and were eight-micron aggregates or botryoid unit of smaller capsules.

The water-immiscible, liquid capsule nucleus material, or internal phase, was prepared by heating 152 grams of "Aroclor 1242" and 1.6 grams of low-viscosity ethyl cellulose (such as ethyl cellulose having an ethoxyl content of 47.5%, by weight, and a viscosity of 4 centipoises when dispersed dry in a 5%, by weight, concentration in an 80/20 toluene-ethanol bath at 25 degrees centigrade) to 105 degrees centigrade, and, after the mixture was cooled to 90 to 95 degrees centigrade, adding to and dissolving in the mixture 5 grams of Crystal Violet Lactone. This internal phase was set aside until used in the next step. In this next step, in a separate vessel, there was formed a dispersion of 40 grams of porkskin gelatin, having its iso-electric point approximately at pH 8, in 320 grams of water. To this was added 25 grams of a 2%, by weight, aqueous solution of poly(methyl vinyl ether-maleic anhydride) copolymer, and the whole aqueous system was adjusted to 60 degrees centigrade. The internal phase, previously prepared, was poured into this aqueous mixture, and the system was adjusted to about pH 7. The internal phase was emulsified into the aqueous medium and contents until the drop size of the internal phase liquid was of the order of about 1 to 2 microns. After the emulsion was formed, the pH of the aqueous vehicle and contents was raised to 9, and there was added to the system 26 grams of gum arabic dissolved in 212 grams of water, with constant heating and agitation, the pH being kept adjusted to 9 during the addition. Next was added 1,740 grams of water, the system being kept heated to 60 degrees centigrade, at which time the condition of the system was gradually changed to cause the formation of complex coacervate entities by lowering the pH of the system over a period of ten minutes to 4.5, by the addition of an aqueous solution of acetic acid. As the pH of the system was being lowered, coacervated complex polymeric entities were forming, the first entities forming deposits around the droplets of water-immiscible internal phase individually, after which the coated droplets tended to cluster into small botryoid units. Upon continued lowering of the pH and the formation of more complex coacervate entities of different polymer fractions, these botryoid units individually were coated with a surrounding wall of complex coacervate polymeric material, the polymeric material depositions at this point still being in liquid form. With continued agitation, the system was rapidly cooled, over a period of a half-hour at the maxium, to 10 to 15 degrees centigrade to cause the deposited complex polymeric material to set to a firm condition. To allow most of the residual undeposited colloid complex polymeric material entities to deposit, the system was allowed to stay under agitation at this temperature for approximately one half-hour. The capsule walls were then hardened by addition of 20 grams of a 25%, by weight, aqueous glutaraldehyde solution, which hardening was completed by continued agitation of the system for several hours or more.

Example 4.—(Coated record sheet)

Paper was coated with the aqueous slurry of Example 3 according to the following formulation:

200 grams of the aqueous slurry of Example 3;
25 grams of 20%, by weight, aqueous starch dispersion;
20 grams of "Solka-Floc BW-200" (a short fiber alpha-cellulose supplied by Brown Company, 277 Park Ave., New York, N.Y., United States of America);
7.5 grams of talc;
5.0 grams of "Syloid 244" (a highly porous silica gel with particle size of 2 to 3 microns, supplied by Davison Chemical Company, Baltimore, Md., United States of America).

The above mixture was agitated in a Waring Blendor, at slow speed, for five minutes. After being blended, the mixture had developed a light-blue color. A sheet of paper coated with this formulation, by means of a Meyer rod, and dried, appeared white. The dry coat weight was 4.5 to 5.0 pounds per specified ream. The paper showed reasonably good smudge resistance. When used face up as a second sheet behind a card stock sheet of paper on which characters were typed, the coated sheet exhibited similar characters of slightly weak intensity and excellent definition.

The above formulation was quite blue after standing one hour, but white paper coated at this time with the "quite blue" composition with 4.7 pounds per specified ream appeared nearly white, and that coated with 7.0 pounds per specified ream appeared only very faintly blue. Color development in the aqueous slurry in this example is due to contact of the Crystal Violet Lactone with the strongly acidic manufacturing medium and not to the encapsulated acid reactant. If more time is needed before the aqueous coating slurry begins developing color, the pH should be adjusted to about 7, as in Example 2.

Example 5.—(Coating composition)

An aqueous slurry was made of 20%, by weight, of a 1:1 mixture, by weight, of the capsules of Example 1, Section (a), and capsules containing Crystal Violet Lactone and having gelatin-gum arabic walls hardened with glutaraldehyde and uranyl nitrate, as taught and claimed in United States application for Letters Patent Ser. No. 586,943, filed Oct. 17, 1966, in the name of Donald D. Emrick and assigned to the assignee herein. The method for making and hardening the "Emrick" capsules follows:

Into a Waring Blendor cup of about 2.0 liters capacity were placed 160 milliliters of a 2%, by weight, solution of Crystal Violet Lactone in "Aroclor 1242" and 180 milliliters of 11%, by weight, aqueous gelatin solution. The internal phase ("Aroclor 1242" with dissolved Crystal Violet Lactone) was dispersed in the aqueous phase by agitation at low speed for eight minutes. The pH of the dispersion was adjusted to 9.0 before 120 milliliters of an 11%, by weight, aqueous gum arabic solution, 60 milliliters of a 1%, by weight, aqueous poly(methyl vinyl ether-maleic anhydride) solution, and 800 milliliters of water were added with continued stirring. With continued stirring, the pH was again adjusted to 9.0, and the temperature was raised to 50 degrees centigrade. The pH was slowly lowered to 4.6 to cause emergence of and deposition of the coacervate phase about the oily inner phase. The stirred mixture was then chilled to 10 degrees centigrade to gel the capsule walls. To the continually-stirred suspension, 10 milliliters of 25%, by weight, aqueous glutaraldehyde solution was added, followed one hour later by the addtion of 400 milliliters of 2%, by weight, aqueous uranyl nitrate solution which had the pH adjusted to 4.5 with ammonium hydroxide before the addition.

The aqueous slurry of this example, comprising the capsules prepared immediately above and capsules of Example 1, Section (a), was similar in stability toward color development (when stored) to the coating formulation of Example 4.

Example 6.—(Coated record sheet)

Acid-co-reactant-containing capsules were made with phenolic-aldehyde resin-impregnated poly(vinyl alcohol) walls according to the directions in Example 1, Section (a), except that toluene was used as the solvent for the p-phenylphenol-formaldehyde resin in place of the tetrachloroethylene of that example. When these capsules were used in place of the capsules of Example 1, Section (a), to coat paper as in Example 2, prints of better intensity were achieved than in that example, where the acid co-reactant's solvent was tetrachloroethylene.

What is claimed is:

1. An aqueous slurry for coating record sheet material, which slurry, when applied to the sheet material and dried, leaves a layer composed of minute liquid-containing, marking-pressure-rupturable capsules of at least two kinds, interspersed and contiguously juxtaposed, said slurry including, in combination, a water vehicle and about 10% to 30% solids, by weight, said solids comprising at least two kinds of liquid-containing capsules, the kinds being distinguished both by the kind of capsule wall material and by the kind of liquid contents, one kind of capsule having pressure-rupturable walls of hydrophilic, polymeric, film-forming material impregnated with the cured polymeric reaction product of a phenol and an aldehyde to render said walls impervious to liquid diffusion and containing a liquid dispersion of acidic material, and another kind of capsule having walls of hydrophilic, polymeric, film-forming material and containing a liquid dispersion of substantially colorless, chromogenic material of base-reacting character which produces a distinctively colored product when allowed to react with the acidic contents of the first kind of capsule.

2. An aqueous slurry of claim 1 wherein the capsules containing the acidic material have walls of poly(vinyl alcohol) impregnated with the polymeric reaction product of resorcinol and formaldehyde.

3. An aqueous slurry of claim 1 wherein the liquid dispersion of acidic material is a liquid dispersion of an oil-soluble, polymeric, phenolic material.

4. An aqueous slurry of claim 2 wherein the liquid dispersion of acidic material is a liquid dispersion of an oil-soluble, polymeric phenolic material.

5. In a record sheet yielding distinctively colored marks when and where subjected to marking pressures yet resisting coloration due to application of casually-applied, moderate environmental forces and conditions met with in handling and storage, including a base support sheet of record material, and a coating on a surface thereof of a mixture of at least two kinds of minute, pressure-rupturable, liquid-containing capsules interspersed in closely-packed contiguous juxtaposition, so that a marking member pressure applied to the coating will rupture capsules of both kinds in the area of applied pressure, one kind of capsule having a liquid content comprising a substantially colorless basic dye in colorless stage and having walls of a hydrophilic, polymeric, film-forming material, and another kind of capsule having a liquid content of sufficient acid strength to cause the basic dye to assume its colored state on mingling of the liquids from the two kinds of capsules, the improvement consisting of the acid-liquid-containing capsule walls being of a hydrophilic, polymeric, film-forming material having an impregnation of cured phenolic-aldehyde resin, to render the capsule walls strong and impermeable to passage of liquids and the coated sheet stable against the effects of moderate pressure, moisture, and vapor transfer.

6. A record sheet of claim 5 wherein the capsules containing the acidic material have walls of poly(vinyl alcohol) impregnated with the polymeric reaction product of resorcinol and formaldehyde.

7. A record sheet of claim 5 wherein the liquid dispersion of acidic material is an organic liquid dispersion of an oil-soluble, polymeric, phenolic material.

8. A record material of claim 6 wherein the liquid dispersion of acidic material is an organic liquid dispersion of an oil-soluble, polymeric, phenolic material.

References Cited

UNITED STATES PATENTS

| | | | |
|---|---|---|---|
| 2,886,445 | 5/1959 | Rosenthal et al. | 99—135 |
| 2,929,736 | 3/1960 | Miller et al. | 117—36.9 |
| 3,080,318 | 3/1963 | Claus | 117—100 |
| 3,427,180 | 2/1969 | Phillips | 117—36.2 |
| 3,432,327 | 3/1969 | Kan et al. | 117—36.8 |
| 3,447,945 | 6/1969 | Mishima et al. | 117—36.2 |
| 3,451,338 | 6/1969 | Baum | 117—36.9 |
| 3,455,721 | 7/1969 | Phillips et al. | 117—36.2 |

MURRAY KATZ, Primary Examiner

U.S. Cl. X.R.

117—155; 252—316; 260—38, 844